United States Patent [19]

Blee et al.

[11] Patent Number: 4,631,515
[45] Date of Patent: Dec. 23, 1986

[54] VEHICLE GEAR SHIFT INDICATOR

[75] Inventors: Timothy J. Blee; Norman P. Deane, both of Rugby, Great Britain

[73] Assignee: AE PLC, Warwickshire, England

[21] Appl. No.: 452,083

[22] Filed: Dec. 22, 1982

[30] Foreign Application Priority Data

Apr. 22, 1981 [GB] United Kingdom ............... 8112478

[51] Int. Cl.$^4$ ............................................. B60Q 1/00
[52] U.S. Cl. .................................... 340/62; 340/52 F
[58] Field of Search ...................... 340/62, 52 R, 52 F; 364/424.1, 442; 74/866, 335, DIG. 7

[56] References Cited

U.S. PATENT DOCUMENTS

| 3,420,328 | 1/1969 | Johnson et al. | |
| 4,067,232 | 1/1978 | Murray | 340/52 R |
| 4,171,030 | 10/1979 | Ruhl | 340/62 |
| 4,208,925 | 6/1980 | Miller et al. | |
| 4,210,908 | 7/1980 | Sakakibara | 340/52 R |
| 4,323,895 | 4/1982 | Coste | 340/62 |
| 4,355,296 | 10/1982 | Drone | 340/62 |
| 4,425,620 | 1/1984 | Batcheller et al. | 340/52 F |
| 4,439,158 | 3/1984 | Weber | 434/71 |
| 4,463,427 | 7/1984 | Bonnetain et al. | 364/442 |
| 4,494,404 | 1/1985 | Strifler | 340/52 R |

FOREIGN PATENT DOCUMENTS

| 860965 | 2/1961 | United Kingdom . |
| 1083940 | 9/1967 | United Kingdom . |
| 1386961 | 3/1975 | United Kingdom . |
| 1493623 | 11/1977 | United Kingdom . |
| 2068119A | 8/1981 | United Kingdom . |

Primary Examiner—John W. Caldwell, Sr.
Assistant Examiner—Tyrone Queen
Attorney, Agent, or Firm—Leydig, Voit & Mayer

[57] ABSTRACT

An indicator panel 20 has an array of LED's 25A to 25Q to provide an indication to the driver of a road vehicle, particularly a diesel-powered truck, when he should change to the next highest gear during acceleration from rest or low speed. The LED's are lit progressively as the engine speed increases in each gear and, when lit, emit green light if the engine speed is below the optimum change-up speed for that gear. When the engine speed begins to exceed the optimum change-up speed, the next LED illuminated produces red light to the driver. An audible warning may also be produced. If the driver does not change up in response to such warning, further red LED's will show and a more strident audible warning may be given. The change-up speeds to which the system responds are pre-set so as to be the optimum speeds for increased fuel efficiency. The change-up speed corresponding to the lowest gear is relatively low and increases successively for the successively high gears. The system may be associated with engine speed control or limiting means so as positively to prevent further increase in engine speed if the driver ignores the warning. The system may also produce an indication of the optimum engine speeds at which the driver should change down to the next lower gear during vehicle deceleration.

14 Claims, 3 Drawing Figures

VEHICLE GEAR SHIFT INDICATOR

The invention relates to drive aids for vehicles such as, but not restricted to, road vehicles. Embodiments of the invention to be described provide indications facilitating the efficient control of a road vehicle, such as a diesel-engined truck, by its driver.

According to the invention, there is provided an indicating system for use on a mechanically powered vehicle to indicate to the driver thereof when he should change to a higher gear, comprising means responsive to the particular gear engaged at any time to produce a datum signal having a value representing a datum speed dependent on the identity of the gear, and indicating means responsive to the datum signal and to the actual engine speed and operative when the actual engine speed reaches the datum speed to produce an indication to the driver that he should change to the next higher gear, the values of the datum signals being respectively predetermined so that the respective datum speeds at which the said indications are produced are such that respective gear changes at those speeds promote engine efficiency.

According to the invention, there is also provided a system for indicating to the driver of a road vehicle when he should change to a higher gear, comprising gear-indicating means responsive to the identity of the actual gear engaged at any time to produce a gear-indicating signal, means responsive to the gear-indicating signal to generate an electrical datum signal having a predetermined engine-speed-representing value dependent on the identity of that gear and representing a relatively low engine speed for the lowest gear and successively higher engine speeds for the successively higher gears, an array of light sources for positioning in the vehicle where they may be seen by the driver, and light source control means responsive to each datum signal and to a signal representing actual engine speed to energise the light sources successively as the actual engine speed increases and to modify the indication provided to the driver by the energised light sources when the actual engine speed reaches the speed represented by the datum signal.

According to the invention, there is further provided indicating means for identifying the gear ratio which is currently engaged in a transmission system having a plurality of selectable fixed gear ratios, comprising first transducing means operative to produce a first signal which is proportional to the input speed to the transmission system, second transducing means operative to produce a second signal proportional to the output speed of the transmission system, and signal processing means operative to measure the ratio between the first and second signals to indicate the identity of the engaged gear ratio.

An electrical system embodying the invention and for indicating to the drive of a road vehicle when he should make each gear change for best efficiency, will now be described, by way of example only, with reference to the accompanying diagrammatic drawings in which.

The system to be described is particularly designed for providing an indication to the driver of a diesel-engined truck when he should make each gear change. Large high-power diesel engines, particularly naturally aspirated types, produce maximum torque at relatively low engine rpm, and it is therefore inefficient and wasteful of fuel for the driver to operate the engine at a speed above the peak of the torque/rpm curve when high road speed of the vehicle is not required or possible. Specifically, when starting the truck from rest, it is wasteful of fuel for the driver to run the engine up to a high speed in the lower gears. When starting the truck from rest, the primary requirement in the lower gears is to take the engine speed up to that at which maximum torque is developed. As the truck speed increases, and as each higher gear is engaged in turn, the engine speed immediately prior to each gear change can be successively increased, assuming that the desired final road speed in the highest gear corresponds to an engine speed above the value at which maximum torque is developed.

In other words, for maximum efficiency, when starting the truck from rest, the driver should make each successive gear change at a successively higher engine speed. The system to be described facilitates this.

Figure 1:
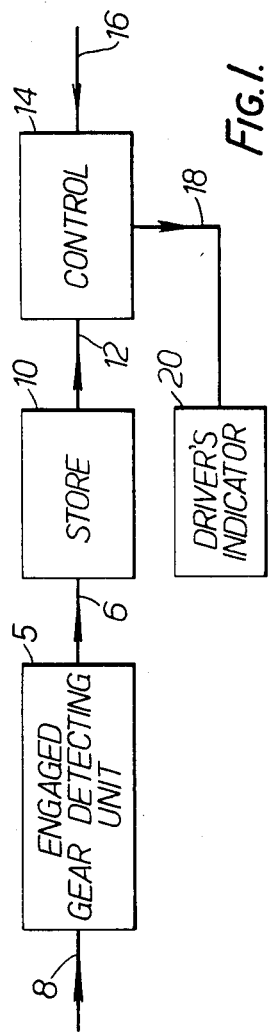
FIG. 1 is a block circuit diagram of one form of the system.

FIG. 1 shows the system in broad outline.

As shown, the system comprises an engaged gear detecting unit 5. The purpose of unit 5 is to produce an output signal on a line 6 identifying the particular gear through which the truck engine is driving the road wheels at any particular time (that is, representing the total gear ratio between the truck engine and the road wheels). The unit 5 receives an appropriate input signal on a line 8. For example, line 8 could be controlled by microswitches responsive to the settings of the driver's gear control lever(s). However, other means for producing the signal on line 8 will be described below.

The gear-indicating signal on line 6 is fed as an input to a data store 10. Store 10 stores a number of different datum signals, a different one for each of the truck's gears. The value of each datum signal represents the optimum engine speed at which the driver should change from that gear to the next higher gear, that is, "optimum" primarily in the sense of promoting maximum fuel efficiency. Therefore, as explained, the datum signal corresponding to the lowest gear will represent a relatively low engine speed and the datum signals for the higher gears will represent successively higher engine speed values. Store 10 responds to the particular gear indicated by the signal on line 6 by outputting the appropriate datum signal on a line 12 and this is fed into a signal processing unit 14. Unit 14 also receives a signal representing actual engine speed on a line 16 and produces an output signal on a line 18 which controls a driver's indicating unit 20. Unit 20 is positioned so as to enable the driver to respond readily to its indication. The unit 20 may provide its indication in any suitable form. For example, it may be a visible indication. Instead, it can be an audible indication. As another example, it could be a combination of visible and audible indications.

The signal processing unit 14 controls the indicating unit 20 so that it provides an indication to the driver when the engine speed of the truck in any particular gear reaches the value at which he should change to the next higher gear.

When he has changed to the next higher gear, the signal processing unit 14 receives the new datum signal on line 12 and is thus able to control the indicating unit 20 so as to provide an indication when the actual engine speed has risen to the (higher) engine speed datum at which he should change up again.

As will be explained in more detail below, the signal processing unit 14 can also be arranged, by means of an appropriate speed control or speed limiting system, to provide a positive limit on the engine speed if the driver should ignore the gear-change-indication provided by the unit 20.

A particular form which the system FIG. 1 can take will now be described in detail with reference to FIGS. 2 and 3.

Figure 2:
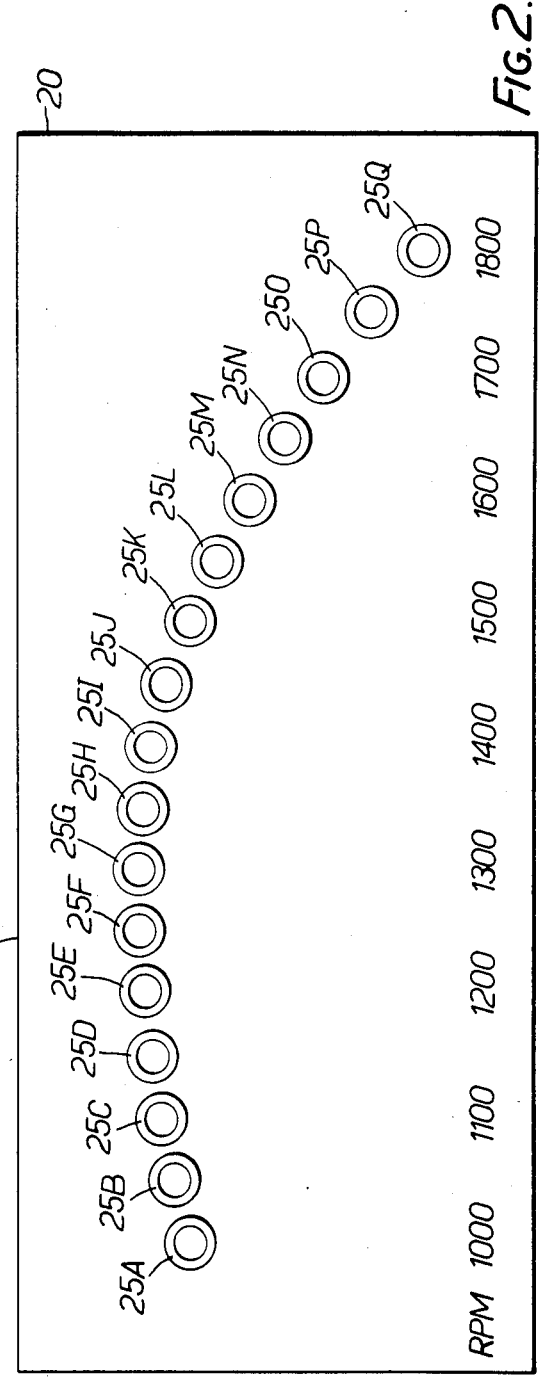
FIG. 2 is a front elevation of an indicator panel showing, diagrammatically, the indication provided to the driver.

FIG. 2 shows one form which the driver's indicator 20 (see FIG. 1) may take. It comprises an array of lamps 25A, 25B . . . 25Q. In this example, therefore, there are seventeen lamps and each one corresponds to an engine rpm increment of 50 rpm. The lamps may cover a speed range from 1,000 to 1,800 rpm, say. As the engine speed increases, the lamps are progressively lit, starting with lamp 25A. Therefore, when the engine speed rises to 1,000 rpm, lamp 25A becomes lit. An increase in engine speed to 1,050 rpm causes lamp 25B to be lit, lamp 25A remaining lit; and so on, until, at an engine speed of 1,800 rpm, all the lamps are lit.

In a manner to be explained in more detail, the colours displayed by the illuminated lamps change so as to indicate to the driver when he should make a gear change.

The lamps 25A to 25Q are physically arranged in a curve which approximately matches the shape of the engine torque/engine rpm curve over the speed range (thus showing that peak torque occurs at about 1,300 rpm in this example). They may be light-emitting dioes (LED's).

The system will now be more specifically described with reference to FIG. 3.

Figure 3:
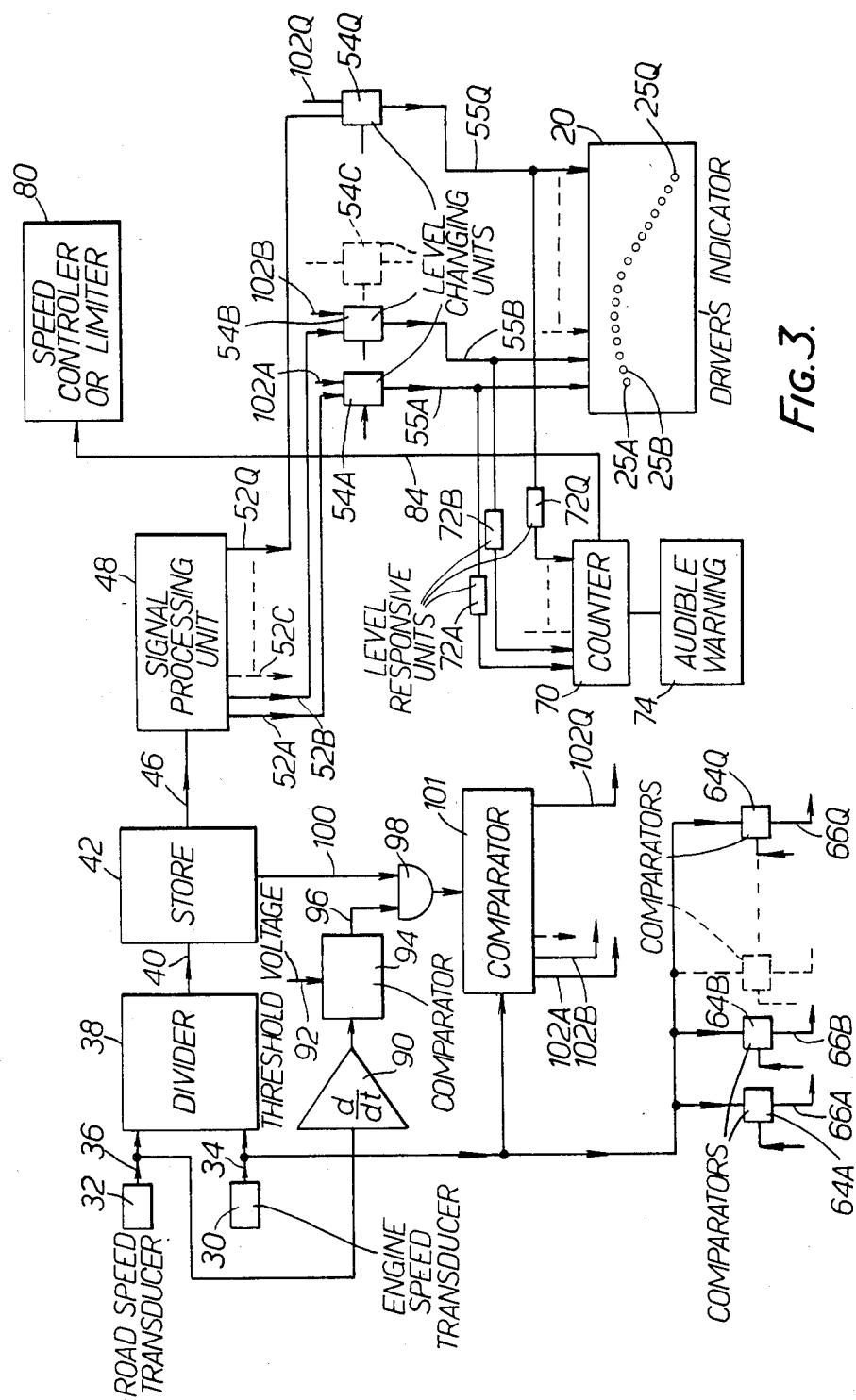
FIG. 3 is a more detailed block circuit diagram of the system.

As shown in FIG. 3, the system is energised by transducers 30 and 32, transducer 30 providing an electrical output on a line 34 representing engine speed and transducer 32 providing an electrical output on a line 36 representing road speed. The transducers 30 and 32 may be of any suitable type. For example, the engine speed transducer 30 may pick up an electrical signal from the driver's engine rpm indicator, and the road speed transducer may pick up an electrical signal from the vehicle tachograph. However, other arrangements are possible. The electrical outputs on lines 34 and 36 may be in analogue or digital form.

Lines 34 and 36 are fed to a dividing circuit 38 which measures the ratio of their signals. This ratio is solely dependent on the particular gear which is engaged, and the divider 38 compares the measured ratio with each of a number of pre-stored datum values, respectively equal to the ratios corresponding to the gears, and produces an electrical output on a line 40 which indicates which gear is engaged at any particular time.

It will be appreciated that the signal on line 40 could instead be generated by, for example, an electromechanical switch arrangement linked to the gearbox or to the gear selector. However, the arrangement specifically illustrated in FIG. 3 has the advantage of simplicity and absence of moving parts.

However generated, the signal on line 40 is then fed into a store 42. This may be in any suitable form and stores a series of electrical datum signals respectively corresponding to the different gears of the truck. The datum signal stored in store 42 for first gear has the lowest value, and the values are progressively greater (but not necessarily in linear proportion) for each of the successively higher gears.

Store 42 accesses the appropriate datum signal, that is, the datum signal corresponding to the particular gear engaged (as indicated by the value of the signal on line 40), and outputs this datum signal on a line 46. This signal is passed to a processing unit 48.

The processing unit 48 has a bank of output lines 52A, 52B . . . 52Q (not all of which are shown) and these are respectively connected to level changing units 54A, 54B . . . 54Q (not all of which are shown), and the actual connections are mostly omitted to avoid unduly complicating the diagram.

The outputs of the level changing units 54A, 54B . . . 54Q are connected by respective lines 55A, 55B . . . 55Q to control respective ones of the lamps 25A, 25B . . . 25Q in the driver's display 20.

The processing unit 48 energises the lines 52A, 54B . . . 52Q according to the value of the signal on line 46, each line 52A, 52B . . . 52Q having either a HIGH value or a LOW value. When the signal level on line 46 is low, only the earliest one or ones in the sequence of lines 52A to 52Q are held at the LOW level and all the remainder are HIGH: for example, with the signal on line 46 at its lowest level (corresponding to first gear), only lines 52A and 52B, say, would be at the LOW level, with all the remainder at the HIGH level. For a signal level on line 46 corresponding to second gear, more of the lines in the series 52A to 52Q would be at the LOW level, such as lines 52A, 52B, 52C and 52D for example, with all the remainder at the HIGH level; and so on for all the other possible values of the signal on line 46. Thus, for a signal level on line 46 corresponding to the highest gear (the truck may have eight or nine gears for example), all the lines 52A to 52Q could be at the LOW level.

The engine speed-dependent signal on line 34 is also connected to feed a bank of comparators 64A, 64B . . . 64Q (only some of which are shown). Each comparator has a second input lines which carries a respective threshold signal (the sources of these thresholds not being shown in the Figure). The comparators 64A to 64Q are connected through the level changing units 54A to 54Q to the LED's by means of respective output lines 66A to 66Q.

When the engine speed is low (below 1,000 rpm in this example), none of the lines 66A to 66Q is energised. As the engine speed increases to 1,000 rpm and beyond, the lines 66A to 66Q successively become energised. The threshold signals applied to the comparators 64A to 64Q are set so that line 66A becomes energised when the engine speed is 1,000 rpm, line 66B becomes energised when the engine speed reaches 1,050 rpm, line 66C becomes energised when the engine speed reaches 1,100 rpm and so on, until line 66Q becomes energised when the engine speed reaches 1,800 rpm (all the earlier-energised lines remaining energised).

As each line 66A to 66Q becomes energised, it causes the corresponding LED 25A to 25Q to become illuminated. Assuming that the corresponding one of the lines 52A to 52Q is at a LOW level, the illuminated LED will emit green light. However, if the corresponding line 52A to 52Q is at a HIGH level, then the corresponding level changing unit 54A to 54Q will cause the illuminated LED to emit red light instead.

The operation of the system as so far described will now be considered.

If the truck is running at a steady relatively high speed in the highest gear, so that its engine speed is above 1,800 rpm, all the LED's 25A to 25Q will be green. If the truck speed now decreases, causing or as a result of a corresponding fall in engine speed, then the LED's will be extinguished one by one as the engine speed falls below 1,800 rpm. Assuming that the truck speed is falling at greater than the threshold rate represented by the signal on line 92, unit 94 will open gate 98 and the comparator 101 will be fed with the datum signal on line 100 representing the minimum appropriate speed for the current gear (top gear); this might be an engine speed of 1,400 rpm for example. Therefore, when comparator 101 determines that the actual engine speed has fallen to 1,400 rpm, it energises the lines 102A to 102I. The resultant signals applied to level changing units 54A to 54I cause the corresponding LED's 25A to 25I to change from green to red. This therefore provides an indication to the driver that he should change to a lower gear.

If the driver allows the engine speed to fall further without making a gear change, then the falling signal on line 34 will cause the comparators 64A to 64I (in this example) to extinguish the LED's one by one.

During such deceleration, the audible warning unit 74 may be disabled.

It will be appreciated that the detailed circuitry shown in FIG. 3 is merely exemplary of the many different possible forms which it can take, and many modifications are possible. For example, but without limitation, the interlinking of the gear change indication system with the speed control system 80 may be omitted, and/or the arrangement of the system so as to provide an indication to the driver when he should change to a lower gear may be omitted.

Although the systems described have been described in relation to trucks and more particularly to trucks powered by diesel engines, they may be applied (with appropriate modification if necessary) to vehicles other than trucks and to vehicles powered by other types of engine, and "vehicle" is not restricted to road vehicles; as examples, it may include rail vehicles and boats.

We claim:

1. An indicating system for use on a mechanically propelled vehicle having a driver-operated engine-driving wheels transmission system using a plurality of separate gears normally operable in an ascending or descending sequence and to indicate to the driver thereof when he should change from the particular one of the gears which is engaged at any time to the next gear in one of the sequences comprising means responsive to the particular gear engaged to produce an electrical datum signal having a value representing a datum speed dependent on the identity of that gear, indicating means comprising means operative in response to predetermined control signals to produce respective ones of a series of indications to the driver indicating with successively greater urgency that he should change to the next gear in the said sequence, means responsive to the actual speed of the engine or of the vehicle to produce an electrical signal representing that speed, control means responsive to the datum signal and to the electrical signal representing the actual speed and operative when the actual speed reaches the datum speed to produce a first one of the said control signals, means feeding the first control signal to the indicating means to cause the indicating means to produce the first said indication in the said series, means responsive to the datum signal and to the electrical signal representing the actual speed and connected to sense whether the driver changes to the said next gear in the sequence in response to the said first indication in the said series and, if he does not, to produce successive further said control signals as the actual speed exceeds the datum speed by a respective predetermined amount or amounts, and means connected to feed the said further control signals to the indicating means to cause the indicating means to produce in succession the other indications in the said series, the values of the datum signals being respectively predetermined so that the respective datum signals are such that respective gear changes at those speeds promote engine efficiency, the datum signals having values which are pre-calculated and are independent of the actual operation of the vehicle at any time.

2. A system according to claim 1, in which the datum speed for the lowest gear represents a relatively low engine speed and the datum speeds for the higher gears represent successively higher engine speeds.

3. A system according to claim 1, in which each said indication is a visible indication.

4. A system according to claim 1, in which each said indication is an audible indication.

5. A system according to claim 1, in combination with a speed control arrangement connected to the vehicle engine and comprising means responsive to an engine speed control signal to positively prevent further increase in engine speed, the system including means responsive to the engine speed exceeding the respective said datum speed for the said particular one of the gears which is engaged at any time to generate a said engine speed control signal, and means feeding the engine speed control signal to the speed control arrangement.

6. A system for indicating to the driver of a road vehicle having a multiple-geared engine-driving wheels transmission system when he should change from a particular one of the gears which is engaged at any time to a higher gear, comprising gear-indicating means responsive to the identity of the said particular one of the gears to produce an electrical gear-indicating signal indicating the identity of that particular gear, means connected to receive and to be responsive to the gear-indicating signal to generate a respective one of a plurality of electrical datum signals having respective predetermined engine-speed-representing values dependent on the identity of the said particular one of the gears and representing a relatively low engine speed for the lowest gear of the transmission system and successively higher engine speeds for the successively higher gears thereof, an array of light sources for positioning in the vehicle where they may be seen by the driver, and light source control means connected to control the array of light sources and connected to receive and to be responsive to each datum signal and to an electrical signal representing actual engine speed whereby to energise the light sources successively As the truck moves off from rest in first gear, the engine speed will be below 1,000 rpm and none of the lines 66A to 66Q will be energised. Therefore, none of the LED's 25A to 25Q will be illuminated. The divider 18 will determine from the ratio of its inputs that first gear is engaged and store 42 will therefore produce the appropriate datum signal output. As explained, this will be at such a value that unit 48 will hold most of its output lines 52A to 52Q at the HIGH level with only lines 52A and 52B (in this example) being at the LOW level.

As the engine speed increases to 1,000 rpm (with the truck still in first gear), line 66A becomes energised and LED 25A becomes lit. Because the corresponding level changing unit 54A is receiving only a LOW level, line 66A is energised at a low level and LED 25A emits green light.

As the engine speed continues to increase, LED 25B will become illuminated and emit green light (because it is assumed in this example that line 52B is at a LOW level).

However, line 52C and all remaining lines up to 52Q are at a HIGH level. Therefore, when the engine speed reaches 1,100 rpm in this example, LED 25C becomes illuminated and emits red light, in contrast to LED's 25A and 25B which are green.

This provides an indication to the driver that he has reached an engine speed value which, for the particular gear engaged at the present time (first gear), is such that he should change to the next higher gear.

If he does not change gear, the engine speed will continue to rise and LED 25D will be illuminated and emit red light, and similarly for LED 25E assuming that he still does not make a gear change.

However, if he does make a gear change, this will be detected by the divider 38 and the store 42 will change the value of the signal on line 46 to a higher value. This causes the processing unit 48 to alter the energisation of the lines 52A to 52Q so that, for example, lines 52A, 52B, 52C and 52D are now all at a LOW level while the remainder (52E to 52Q) are at a HIGH level.

Therefore, LED 25C, which was previously emitting red light, will now change to green, assuming the engine speed is still at 1,100 rpm (clearly, the engine speed may fall slightly during the actual gear change but will then start to rise again in the higher gear).

When the engine speed has reached the appropriate limit for second gear, 1,250 in this example, LED 25E becomes illuminated and emits red light. This indicates to the driver that he must make the next gear change.

This process continues for each succeeding gear, so that the display 20 indicates to the driver the appropriate engine speed at which he should make each gear change.

The datum signals in store 42 are pre-selected so that the indicated gear-change speeds increase successively and according to an appropriate curve so as to obtain maximum fuel efficiency from the engine.

As shown, the lines 55A to 55Q are also connected to a counting unit 70 through level-responsive units 72A, 72B ... 72Q only some of which are shown. The level-responsive units are set so that the counter is only affected by the signals on the lines 52A to 52Q when they have the higher levels corresponding to emission of red light from the associated LED. The counter 70 counts the number of lines 55A to 55Q carrying red-producing levels and operates an audible warning unit 74 accordingly. More specifically, when counter 70 detects one line 55A to 55Q carrying a red-indicating level, it causes the audible warning unit 74 to emit an intermittent low-frequency sound warning to the driver, advising him that the gear-change limit has been reached. If the driver does not make a gear change, then, as explained, the next line of the lines 55A to 55Q will change to a red-indicating level. This will be detected by the counter 70 which causes the warning unit 74 to increase the frequency of its sound output. A still further increase in engine speed without gear change, producing a third red-indicating level input to counter 70, causes the unit 74 to emit a continuous sound output.

The truck may also be fitted with a road speed control system indicated diagrammatically by the block 80. Such a system may take any suitable form, such as, for example, described in our British Pat. Nos. 1386961 and 1493623. Normally such a system 80 operates only when the truck is in the highest gear, so as to limit the truck's road speed to a particular upper speed value (or to control it at that value) and this operation is independent of the gear-change indicating system as so far described. However, the gear-change indicating system described may be linked to the speed control system 80 by means of a line 84 from the counter 70.

Counter 70 energises line 84 when it determines that at least three of the lines 55A to 55Q are carrying red-indicating levels. When the speed control 80 receives the signal on line 84, it operates (irrespective of the particular gear engaged at that time) to prevent further increase in engine speed. Therefore, if the driver persists in ignoring the gear-change indication given by the display unit 20, further increase in engine speed will be positively prevented.

As so far described, the operation of the gear-change indicating system is that which occurs when the truck is accelerating. The operation is different if the vehicle is decelerating, as will now be described.

Deceleration of the truck is sensed by a differentiating unit 90 responsive to the road speed signal on line 36. If the vehicle is decelerating at at least a predetermined rate represented by a threshold on a line 92, a comparator 94 energises a line 96 to open a gate 98.

Besides producing the datum signal on line 46, store 42 produces a second datum signal on a line 100. In contrast to the datum signals on line 46, the datum signals on line 100 represent the minimum appropriate engine speed corresponding to each gear. Line 100 is connected through gate 98 to a comparator 101 which also receives the engine speed indicating signal from line 34. Gate 98 only passes the signal on line 96 to comparator 101 when the truck is decelerating at at least the speed set by the threshold on line 92. Comparator 101 has output lines 102A to 102K and these are connected to third inputs of the level changing units 54A to 54K, the actual connections being omitted. When comparator 101 determines that the actual engine speed has fallen to the level represented by the datum signal on line 100, it energises the corresponding output line 102A to 102K and also all the other ones of its output lines which represent lower speed values. Thus, for example, if the signal on line 100 represents a datum speed of 1,400 rpm, comparator 101 will energise its output line 102I (which is connected to the level changing unit 54I controlling the LED 25I representing 1,400 rpm); in addition, it will energise all the lines 102A to 102H.

The operation of this part of the system will now be considered in more detail.

as the actual engine speed increases, the light source means including modifying means adapted to modify the indication provided to the driver by the energised light sources and means responsive to each datum signal and to the electrical signal representing actual engine speed to sense the extent by which the actual engine speed exceeds the speed represented by the datum signal and operative to actuate the modifying means to cause the array of light sources to produce a series of indications to the driver indicating with successively greater urgency as the said extent increases that he should change to the said next higher gear.

7. A system according to claim 6, in which the light source control means modifies the indication provided by the energised light source or sources by changing the colour of the light emitted thereby.

8. A system according to claim 6, including an audible indicating unit responsive to each datum signal and to the electrical signal representing actual engine speed to produce an audible indication when the actual engine speed exceeds the speed represented by the respective datum signal.

9. A system according to claim 6, in which the light sources are light-emitting diodes.

10. A system according to claim 6, in which the array of light sources is physically arranged in a manner corresponding at least approximately to the shape of the torque versus engine speed characteristic of the engine.

11. A system according to claim 1, applied to a truck or similar heavy road vehicle powered by a diesel engine.

12. A system according to claim 1, in which the said actual speed is the engine speed.

13. A system according to claim 6 in which the gear-indicating means comprises
first transducing means operative to produce a first signal which is proportional to the input speed to the transmission system,
second transducing means operative to produce a second signal which is proportional to the output speed of the transmission system, and
signal processing means operative to measure the ratio between the first and second signals to indicate the identity of the engaged gear ratio.

14. A system according to claim 13, in which the first and second signals are electrical signals.

* * * * *